Oct. 19, 1965
W. H. NEBGEN
3,212,699
GAS COMPRESSION
Filed April 11, 1963
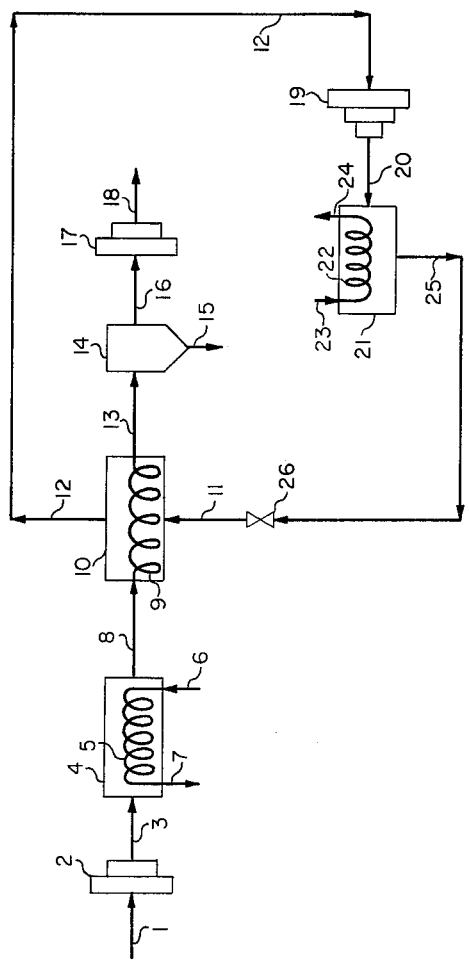
WILLIAM H. NEBGEN
*INVENTOR.*
BY J. Z. Chaloty
AGENT

United States Patent Office 3,212,699
Patented Oct. 19, 1965

3,212,699
GAS COMPRESSION
William H. Nebgen, Woodside, N.Y., assignor to Chemical Construction Corporation, New York, N.Y., a corporation of Delaware
Filed Apr. 11, 1963, Ser. No. 272,346
5 Claims. (Cl. 230—45)

The present invention relates to the compression of a gas stream to elevated pressure, and relates particularly to the compression of ammonia synthesis gas, prior to passing the gas stream to a high pressure ammonia synthesis converter. An improved method of gas cooling is provided, for interstage cooling of a gas stream between stages of compression. The method of the present invention involves two-stage cooling of the gas stream between stages of compression, and provides a water cooling step followed by cooling with a volatile liquid refrigerant.

The following discussion of the present invention will be based on the compression of ammonia synthesis gas, however it will be understood that the method of the present invention is broadly applicable to the interstage cooling of any gas stream between stages of compression. Water cooling of ammonia synthesis gas between stages of compression, in order to reduce compression power costs, is common practice in the prior art. Typical of volatile liquid cooling procedures is the system disclosed in British Patent No. 240,871. In this case, liquid ammonia is employed as the coolant for interstage cooling of ammonia synthesis gas between stages of compression. The liquid ammonia is available as a direct product of the ammonia synthesis process, and is utilized as a refrigeration coolant. Overall improved economy in compression power costs is obtained.

In the present invention, an improved cooling method is provided, which includes the combined usage of water and liquid ammonia as successive coolants for the stepwise cooling of a gas stream such as ammonia synthesis gas, between compression stages. The synthesis gas is compressed to an intermediate level, and heating of the gas stream takes place due to the compression effect. The elevated temperature of the gas stream is reduced to a low level in two stages, prior to further compression. In the first stage, the synthesis gas is cooled to an intermediate temperature level using cooling water. Then the partially cooled synthesis gas stream is further cooled to a final low temperature level by heat exchange with a volatile liquid refrigerant. Ammonia is a preferable refrigerant in the method of the present invention. The fully cooled synthesis gas stream now passes to the next stage of compression.

The method of the present invention provides a significant advantage, in reduced overall power cost for synthesis gas compression. Thus, the increment of power required for compression and recycle of vaporized liquid refrigerant is only a small fraction of the power reduction which is achieved due to reduction in the volume of the gas entering the next stage of compression. This volume reduction is achieved due to the overall interstage cooling effect which is obtained by the method of the present invention.

It is an object of the present invention to provide an improved method of cooling of a gas stream between stages of compression.

Another object is to provide a method of compression of ammonia synthesis gas with reduced total compression power costs.

A further object is to compress ammonia synthesis gas in an improved manner, prior to ammonia synthesis.

An additional object is to cool ammonia synthesis gas between stages of compression by a method using combined cooling effects of a water coolant and a volatile liquid refrigerant.

These and other objects and advantages of the present invention will become evident from the description which follows. In the process description infra, the method of the present invention will be described with reference to the use of ammonia as the volatile liquid refrigerant. However, it will be understood that other volatile liquid refrigerants, such as Freon, propane and butane, are equally applicable for usage in the method of the present invention.

Referring to the figure, a typical flow diagram of the method of the present invention is provided. Ammonia synthesis gas, consisting of a mixed hydrogen-nitrogen stream with these two components in a 3:1 mol ratio, is passed via 1 into compression stage 2 of a multi-stage compression system. The overall compression system is provided in order to compress the synthesis gas to highly elevated pressure prior to catalytic ammonia synthesis. The gas stream is discharged from compression stage 2 via 3, at an intermediate elevated pressure. Stream 3 is also at an elevated temperature, typically in the range of 200° F. to 300° F., because of the heating effect which is generated due to the gas compression.

The gas stream 3 is now cooled in accordance with the method of the present invention, prior to further compression in the next compression stage. Stream 3 is thus passed through cooler 4, which is provided with cooling coil 5. Cooling water is passed into coil 5 via 6, and warmed cooling water is discharge via 7. An initial portion of cooling of the gas stream is thus provided, and the partially cooled gas stream is discharged from cooler 4 via 8, typically at a tempreature in the range of 80° F. to 110° F. Stream 8 is next passed through the coil 9 of gas cooler 10. Liquid ammonia coolant is also passed into cooler 10 via 11 at a reduced pressure. The liquid ammonia is vaporized by heat exchange with the gas stream in coil 9, and leaves via 12 as a stream of ammonia vapor. The ammonia is vaporized at a temperature typically in the range of 10° F. to 30° F., and thus the gas stream is cooled to a lower final temperature typically in the range of 35° F. to 50° F.

As a result of cooling, the cold gas stream 13 leaving coil 9 will usually contain condensed liquid water. Stream 13 is thus passed into gas-liquid separator 14, which is a conventional cyclonic or baffled device for separation of entrained liquid from a gas stream. The liquid condensate stream is withdrawn from unit 14 via 15, and the dry gas stream is discharged from unit 14 via 16. Stream 16 is now passed to compression stage 17 of the multi-stage compression system, and is discharged via 18 at a more highly elevated pressure and temperature. Stream 18 is subsequently also cooled in accordance with the method of the present invention, in a manner similar to stream 3 as described supra.

Returning now to unit 10, ammonia vapor stream 12 is processed in accordance with a conventional refrigeration cycle and is recycled to unit 10 as liquid ammonia. Stream 12 is thus compressed in compressor 19 to an elevated pressure, and is discharged as hot compressed ammonia via 20. Stream 20 is cooled in heat exchanger 21, which is provided with cooling coil 22. Cooling water is passed into coil 22 via 23, and warmed water is removed via 24. Cooling of the hot ammonia vapor at elevated pressure in unit 21 results in the formation of condensed liquid ammonia, which is withdrawn via 25 at elevated pressure and temperature typically in the range of 90° F. to 120° F. Stream 25 is passed through pressure reducing valve 26, and is recycled via 11 for further cooling in unit 10.

Numerous variations within the scope of the present invention will occur to those skilled in the art. Thus for example, if the synthesis gas stream is substantially free of water vapor, unit 14 and its function may be omitted. The cooling method of the present invention is applicable to interstage cooling between a plurality of cooling stages as required. Other refrigeration cycles or conditions besides those described supra may be adopted. A large difference in refrigerant pressure levels may be maintained in the refrigeration cycle, such that stream 11 is subcooled and absorbs heat from the gas stream in coil 9 as sensible heat of liquid ammonia as well as heat of vaporization. For purposes of economy in apparatus design, a plurality of gas streams derived from separate compression stages may be cooled in a single cooling unit such as 10, by providing a separate cooling coil in the unit 10 for each gas stream.

An industrial application of the method of the present invention to interstage cooling of ammonia synthesis gas will now be described.

*Example*

An industrial facility producing 300 long tons/day of ammonia and compressing 3462 mols/hour of synthesis gas (dry basis) was provided with interstage cooling in accordance with the method of the present invention. Three stages of compression were employed, with inlet gas pressure of 204 p.s.i.g. and final discharge pressure of 5100 p.s.i.g. The gas temperature at discharge from each compression stage was 230° F., and initial interstage cooling of the gas stream to 100° F. was carried out by heat exchange with cooling water. Interstage heat transfer rate in water cooling was 1,500,000 B.t.u./hour at each stage, and the cooling water was warmed from 85° F. to 100° F. in the heat exchanger. The partially cooled gas stream was further cooled from 100° F. to 40° F. between stages and prior to further compression by heat exchange with liquid ammonia in an ammonia chiller. Inlet liquid ammonia temperature was 100° F., and ammonia vapor was recovered from the ammonia chiller at a temperature of 21° F. Interstage heat transfer rate in ammonia cooling was 765,000 B.t.u./hour. A gas-liquid separator was provided after the ammonia chiller, to remove liquid condensate water from the cooled gas stream.

Gas compression in this system required 10,000 horsepower. In prior compression systems of the same total capacity, interstage cooling using only cooling water had a total power requirement for compression of 11,100 horsepower. The reduction in compression horsepower requirement was directly attributable to the lowered inlet gas temperature and concomitant reduction in the volume of synthesis gas at the suction inlets to the second and third stage compressor cylinders, resulting from the cooling system of the present invention. The total power requirement for the ammonia refrigeration cycle was 300 horsepower, giving a net power reduction of 800 horsepower. It was calculated that if the entire synthesis gas interstage cooling load was carried by ammonia refrigeration alone, no net savings in power requirement would be obtained. Thus the combination method of the present invention provided substantial operating advantages due to reduction in total power costs, as compared to interstage cooling using either water cooling or ammonia refrigeration alone.

What I claim is:
1. Method of compressing a gas stream containing water vapor in a plurality of compression stages, with improved interstage cooling using a recirculating volatile liquid refrigerant selected from the group consisting of ammonia, Freon, propane and butane for gas cooling between stages of gas compression, which comprises compressing said gas stream to an intermediate pressure level in a first compression stage, whereby said gas stream is heated, cooling said gas stream by heat exchange with liquid water, further cooling said gas stream to a lower final temperature of at least 35° F. by exchange with a recirculated volatile liquid refrigerant, whereby said refrigerant is vaporized, further compressing said gas stream to a higher pressure level in a second compression stage, compressing said vaporized refrigerant, cooling said compressed refrigerant vapor by heat exchange with liquid water to form condensed liquid refrigerant, and recycling said condensed liquid refrigerant at lower pressure for further heat exchange with said gas stream.

2. Method of compressing ammonia synthesis gas containing water vapor in a plurality of compression stages, with improved interstage cooling using recirculating liquid ammonia for synthesis gas cooling between stages of synthesis gas compression, which comprises compressing said gas stream to an intermediate pressure level in a first compression stage, whereby said gas stream is heated to a temperature in the range of 200° F. to 300° F., cooling said gas stream to a temperature in the range of 80° F. to 110° F. by heat exchange with liquid water, further cooling said gas stream to a temperature in the range of 35° F. to 50° F. by heat exchange with recirculated liquid ammonia, whereby said liquid ammonia is vaporized at a temperature in the range of 10° F. to 30° F., further compressing said gas stream to a higher pressure level in a second compression stage, compressing said vaporized ammonia, cooling said compressed ammonia vapor by heat exchange with liquid water to form condensed liquid ammonia at a temperature in the range of 90° F. to 120° F., and recycling said condensed liquid ammonia at lower pressure for further heat exchange with said gas stream.

3. Method of claim 2 in which said gas stream at a temperature in the range of 35° F. to 50° F. is passed through condensate separator means prior to compression in said second compression stage, whereby liquid water condensate is removed from said gas stream.

4. Method of compressing an ammonia synthesis gas stream containing water vapor in a plurality of compression stages, with improved interstage cooling using a recirculating volatile liquid refrigerant selected from the group consisting of ammonia, Freon, propane and butane for synthesis gas cooling between stages of synthesis gas compression, which comprises compressing said ammonia synthesis gas stream to an intermediate pressure level in a first compression stage, whereby said gas stream is heated, cooling said gas stream by heat exchange with liquid water, further cooling said gas stream to a lower final temperature of at least 35° F. by heat exchange with said recirculated volatile liquid refrigerant, whereby said refrigerant is vaporized, further compressing said gas stream to a higher pressure level in a second compression stage, compressing said vaporized refrigerant, cooling said compressed refrigerant vapor by heat exchange with liquid water to form condensed liquid refrigerant, and recycling said condensed liquid refrigerant at lower pressure for further heat exchange with said gas stream.

5. Method of claim 4, in which said gas stream which is further cooled to a lower final temperature of at least 35° F. contains condensed liquid water, and said gas stream is passed through condensate separator means prior to compression in said second compression stage, whereby liquid water condensate is removed from said gas stream.

References Cited by the Examiner
UNITED STATES PATENTS

| | | | |
|---|---|---|---|
| 1,593,664 | 7/26 | Mitchell | 62—505 |
| 1,626,083 | 4/27 | Harris | 62—505 |
| 2,206,115 | 7/40 | Obreiter | 62—505 |
| 2,837,895 | 6/58 | Webb | 230—45 |
| 3,022,638 | 2/62 | Caswell et al. | 62—505 |

FOREIGN PATENTS

| | | |
|---|---|---|
| 558,075 | 12/57 | Belgium. |
| 343,067 | 10/21 | Germany. |
| 675,840 | 5/39 | Germany. |

DONLEY J. STOCKING, *Primary Examiner.*

LAURENCE V. EFNER, *Examiner.*